(12) United States Patent
Griffin

(10) Patent No.: US 6,856,523 B2
(45) Date of Patent: Feb. 15, 2005

(54) LEVEL SHIFTED DRIVE FOR CLAMP DEVICE

(75) Inventor: Ralph Griffin, Reseda, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 10/610,226

(22) Filed: Jun. 30, 2003

(65) Prior Publication Data

US 2004/0264217 A1 Dec. 30, 2004

(51) Int. Cl.[7] .............................................. H02M 3/335
(52) U.S. Cl. .................................. 363/21.1; 363/56.11
(58) Field of Search ........................... 363/21.01, 56.11, 363/21.04, 21.12, 131

(56) References Cited

U.S. PATENT DOCUMENTS

| | | | |
|---|---|---|---|
| 4,672,517 A | 6/1987 | Mandelcorn | |
| 5,282,123 A | * 1/1994 | Boylan et al. | ............. 363/21.1 |
| 5,973,939 A | 10/1999 | Tan | |
| 5,978,238 A | 11/1999 | Liu | |
| 6,069,799 A | * 5/2000 | Bowman et al. | ............... 363/20 |
| 6,452,818 B1 | 9/2002 | Simopoulos | |
| 6,473,317 B1 | 10/2002 | Simopoulos | |

OTHER PUBLICATIONS

"Single Ended Active Clamp/Reset PWM", *SLUS292A*, Feb. 1999–Revised Jan. 2002, p. 1–11.

* cited by examiner

*Primary Examiner*—Shawn Riley
(74) *Attorney, Agent, or Firm*—Tarolli, Sundheim, Covell & Tummino L.L.P.

(57) ABSTRACT

A DC/DC converter device is provided that employs a clamp device to limit the peak voltage of a main power switch coupled to a primary winding of a transformer. The clamp device is driven employing a driver circuit coupled to a level shifter circuit. The level shifter circuit shifts the voltage level transitions of a clamp device drive signal from a first voltage level to a second voltage level range to drive the clamp device with a voltage that is outside a voltage range of an input supply voltage.

25 Claims, 6 Drawing Sheets

LEVEL SHIFTED DRIVE FOR CLAMP DEVICE

TECHNICAL FIELD

The present invention relates generally to circuit devices, and more particularly to a level shifted drive for a voltage clamp device employed in an electrical power converter.

BACKGROUND OF THE INVENTION

An electrical power converter is a circuit that converts electrical power having one voltage and current characteristic into electrical power having a specified output voltage and current characteristic. In applications requiring conversion of electrical power from Direct Current to Direct Current (DC/DC power converters), switch mode DC/DC converter are frequently employed. A DC/DC converter is typically used to convert an unregulated source of voltage into a regulated source of constant voltage. A switch mode DC/DC converter can include a transformer having primary and secondary windings and a solid state power switch coupled to the primary windings that controls the energy transfer from the primary to the secondary windings. Certain switch mode DC/DC converters employ a duty cycle modulator (DCM) device that controls the switching of the power switch. The DCM device varies the duty cycle of the pulse to define the ratio of switch on time over the switching period and control the output voltage of the DC/DC converter. However, in many applications the need to increase switching frequencies results in an increase in switching losses. Therefore, DC/DC converter power designers employ a variety of schemes to eliminate or minimize losses associated with the DC/DC converters.

A forward converter is one type of DC/DC converter. The forward converter is a switch mode DC/DC converter that employs a power switch and a transformer to convert the input voltage into an output voltage. The transformer enables isolation of the input circuitry from the output circuitry. The forward converter is a common technique of converting electrical power from one DC voltage to another. The active clamp circuit is one technique for reducing power loss and voltage stress on the power transistors of this type of power converter. The active clamp circuit limits the peak voltage of the power transistor during switching cycles and facilitates the balancing of magnetic fields in the power transformer to allow for slightly smaller transformers. This allows a designer to employ lower voltage rating power transistors in the DC/DC converter. The lower voltage rating power transistors are capable of handling more current and power.

However, the active clamp circuit is not very popular in forward converters since it is difficult to drive the clamping circuit. For example, if a p-type Metal-Oxide-Semiconductor Field-Effect Transistor (MOSFET) device operating in an enhancement mode is employed to limit the peak voltage of an n-type MOSFET power transistor, a second power supply is needed to provide a voltage below ground to drive the gate of the p-type MOSFET device. If an n-type MOSFET device operating in enhancement mode is employed to limit the peak voltage of a power transistor, another transformer is necessary to drive the gate of the n-type MOSFET device, so that the gate-to-source voltage of the n-type MOSFET device remains stable.

Another type of power converter is the double forward converter. The double forward converter provides two power pulses to the output within one switching cycle. Hence it is inherently more efficient than the classic forward converter and its modern derivatives. This type of power converter requires the active clamp circuit. The double forward converter includes a transformer having a single primary winding and two secondary windings for each output. A main switch is connected in series with the primary winding. The main switch is controlled by a duty cycle modulator control circuit. A clamping switch is coupled across the main switch through a capacitor. The capacitor and clamp switch are employed to automatically transfer energy stored in the transformer primary winding, while the main switch is off, back to the voltage source connected to the transformer primary winding and also to limit the peak voltage of the main switch. The clamping switch of the double forward converter is also difficult to drive without a negative power supply or additional transformer.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to a DC/DC converter device employing a clamp circuit to limit the peak voltage of a main power switch at a terminal of a primary winding of a transformer and to maintain the volt-seconds balance on the transformer during the switching of the main power switch. The clamp circuit includes at least one active clamping device (e.g., a clamping transistor). For example, the clamping device can be a transistor such as an enhancement-mode P-channel MOSFET, or an enhancement mode N-channel MOSFET, or any device that exhibits similar characteristics to an enhancement mode MOSFET. The clamp device is driven by a clamp device drive signal with voltage level transitions that switch the clamp device between "ON" and "OFF states, while the power switch is driven by a power switch drive signal that shifts the power switch between "ON" and "OFF" states. The level shifter circuit shifts the voltage level transitions of the clamp device drive signal from a first voltage level range to a second voltage level range to drive the clamp device with a voltage outside of a voltage range of an input power supply voltage.

In one aspect of the invention, the main power switch is an enhancement-mode N-channel or n-type MOSFET, and the clamping device is an enhancement-mode P-channel or p-type MOSFET. The gate drive command signals have a sequence of transitions to mitigate current conduction of the clamp device and the power switch at the same time. A level shifter circuit shifts the clamping device drive signal from voltage level transitions between a specified positive voltage and near or about zero volts to voltage level transitions between near or about zero volts and a specified negative voltage.

In another aspect of the invention, the main power switch is an enhance-mode P-channel MOSFET and the clamping device is an enhancement-mode N-channel MOSFET. The gate drive command signals have a sequence of transitions to mitigate current conduction of the clamp device and the power switch at the same time. A level shifter circuit shifts the clamping device drive signal from voltage level transitions between near or about the maximum supply input voltage and the maximum supply input voltage minus a specified voltage, to voltage level transitions between a specified positive voltage above the maximum supply input voltage and near or about the maximum supply input voltage.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF INVENTION

The present invention relates to a DC/DC converter device that employs a clamp device to limit the peak voltage of a main power switch coupled to a primary winding of a transformer. The clamp device is driven employing a driver circuit coupled to a level shifter circuit. The level shifter circuit shifts the voltage level transitions of a clamp device drive signal from a first voltage level range to a second voltage level range to drive the clamp device with a voltage that is outside a voltage range of an input supply voltage.

The present invention can be employed in a forward converter, double forward converter, or any power converter which enables the transmission of power through a transformer, and which applies the same polarity of voltage stress and current stress on the primary-side power transistors as that of a forward converter, or double forward converter for at least 60% of the time when operating at full power. This includes converters that apply reverse polarity current to the main switching transistor.

Figure 1:
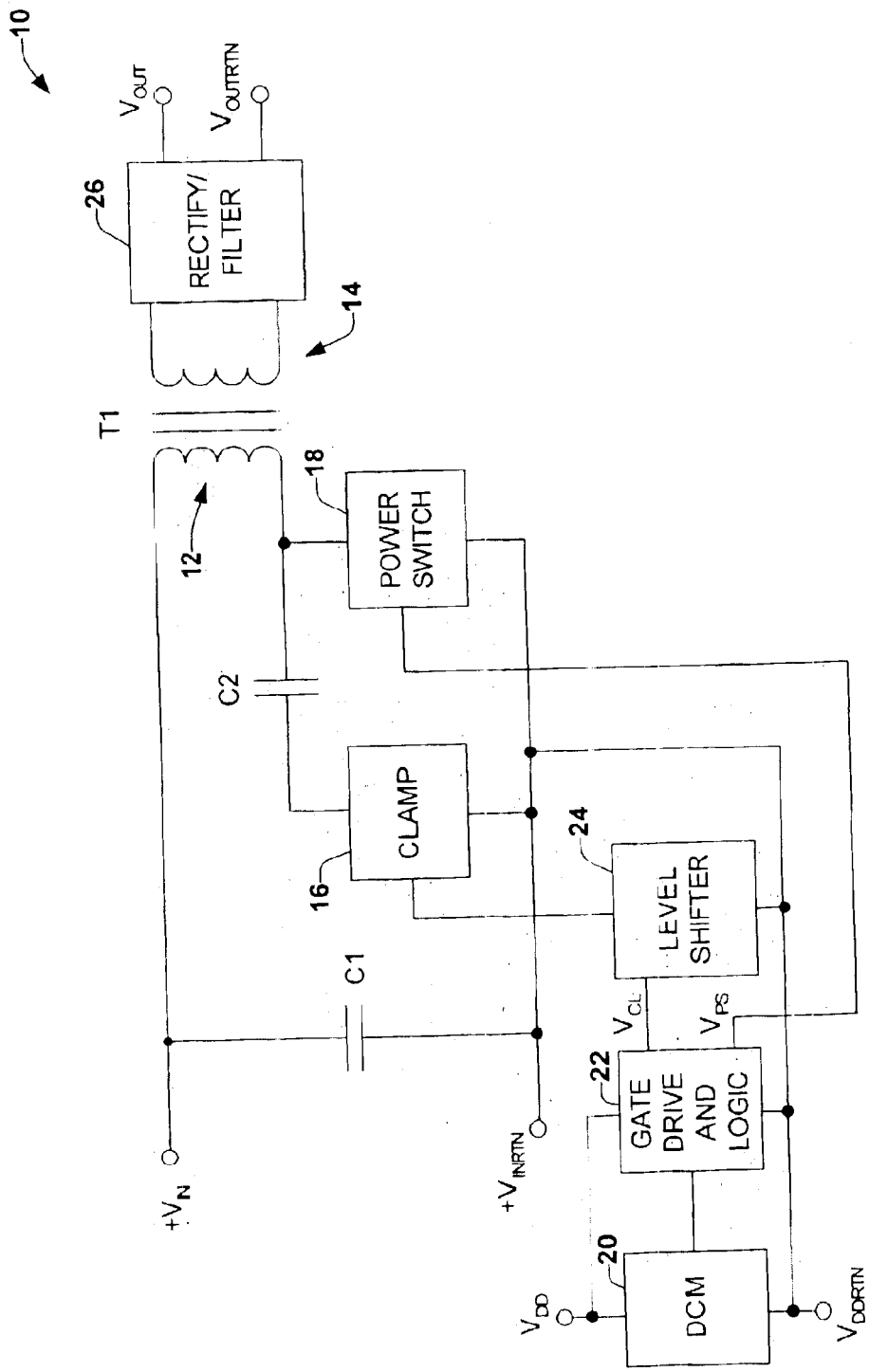
FIG. 1 illustrates a schematic block diagram of a DC/DC converter in accordance with an aspect of the present invention.

FIG. 1 illustrates a DC/DC converter 10 in accordance with an aspect of the present invention. The DC/DC converter 10 includes a transformer T1 having a primary winding 12 magnetically coupled to at least one secondary winding 14. The primary winding 12 has a first terminal coupled to an input supply voltage $+V_{IN}$ and a second terminal coupled to a first terminal of a main power switch 18 to form a common node. A second terminal of the main power switch is coupled to the input supply return terminal $+V_{INTRN}$. An input filter capacitor C1 is coupled to the input supply terminal $+V_{IN}$ and the input supply return terminal $+V_{INRTN}$. The main power switch 18 is driven by a gate drive and logic device 22, which is controlled by a duty cycle modulator (DCM) 20. The gate drive and logic device 22 generates a power switch drive signal $V_{PS}$ to drive the main power switch 18 and a clamp device drive signal $V_{CL}$ to drive a clamp device 16. The main power switch 18 is switched between an "ON" and an "OFF" state. While the main power switch 18 is "ON" it connects the primary winding 12 across the input voltage supply from $+V_{IN}$ to $+V_{INRTN}$, and this voltage is electromagnetically coupled by the transformer T1 to the secondary winding 14. While the main power switch 18 is "OFF", the electromagnetic properties of the transformer T1 cause the voltage across the primary winding 12 and secondary winding 14 to change polarity. The alternating voltage on the secondary winding 14 is then rectified and filtered by a rectify/filter circuit 26 to provide a regulated DC output voltage between terminals $V_{OUT}$ and $V_{OUTRTN}$.

The clamp device 16 is coupled to the second terminal of the primary winding 12 or common node through a capacitor C2. The clamp device 16 is also coupled to the input return terminal $+V_{INRTN}$. The DCM 20 and the gate drive and logic device 22 are powered by a positive supply voltage $V_{DD}$. The return $V_{DDRTN}$ of the positive supply voltage $V_{DD}$ is coupled to the return $+V_{INRTN}$ of the input supply voltage $+V_{IN}$. The clamp device 16 is driven by a clamp device drive signal derived from the DCM 20 through the gate drive and logic circuit 22, which is then level shifted by a level shifter 24. The clamp device 16 and the power switch 18 can be transistor devices, such as enhancement mode MOSFET devices, or devices exhibiting similar characteristics to enhancement mode MOSFET devices.

The present invention drives the clamp device 16 utilizing the level shifter 24 to eliminate the need for a negative supply voltage or a separate isolation transformer as required for conventional devices. The clamp device drive signal provided to the clamp device 16 includes voltage level transitions that toggle between ground and a negative voltage to switch the clamp device 16 between an "ON" and an "OFF" state, while the power switch drive signal includes voltage level transitions that toggle between ground and a positive voltage. The clamp device 16 is switched between an "ON" and an "OFF" state in generally opposing states with respect to the "ON" and an "OFF" states of the power switch 18, so that the clamp device 16 and the power switch 18 are not in an "ON" state at the same time. If both the clamp device 16 and the power switch 18 are "ON" at the same time, the capacitor C2 would rapidly discharge causing the energy stored in capacitor C2 to rapidly dissipate through the clamp device 16 and the power switch 18 resulting in power loss and poor efficiency.

During operation, while the clamp device 16 is "OFF", the power switch 18 is turned "ON" causing it to connect the primary winding 12 across the input voltage supply from $+V_{IN}$ to $+V_{INRTN}$. The main power switch 18 is then turned "OFF" causing the voltage across it to increase until it is held by the clamp device 16 in series with the capacitor C2. The clamping device 16 includes or behaves like a diode so that current may flow to the input supply return terminal $+V_{INRTN}$ even while the clamping device is "OFF". The clamping device 16 is then turned "ON". At some time after the power switch 18 is turned "OFF" and before the clamp device 16 is turned "OFF", current flowing through the clamp device 16 changes polarity.

To minimize the voltage stress on the power switch 18, it is necessary to turn "ON" the clamp device 16 before the current flowing through it reaches zero. Before the current changes polarity, it charges the capacitor C2. After the current changes polarity, it discharges the capacitor C2 and actively resets the magnetic field of the transformer T1. The clamping device 16 then turns "OFF" followed by the power switch 18 turning "ON". Current then flows through the primary winding 12 of the transformer T1 from the supply $+V_{IN}$ and through the power switch 18 to $+V_{INRTN}$. The process continuously repeats as the input signals to the clamp device 16 and the power switch 18 cause the clamp device 16 and power switch 18 to turn "ON" and "OFF" in generally opposing states, while the clamp device 16 assures that the voltage on the second terminal of the transformer T1 is limited. The average voltage across the capacitor C2 stabilizes at a value where the charge and discharge currents for each cycle are balanced.

Figure 2:
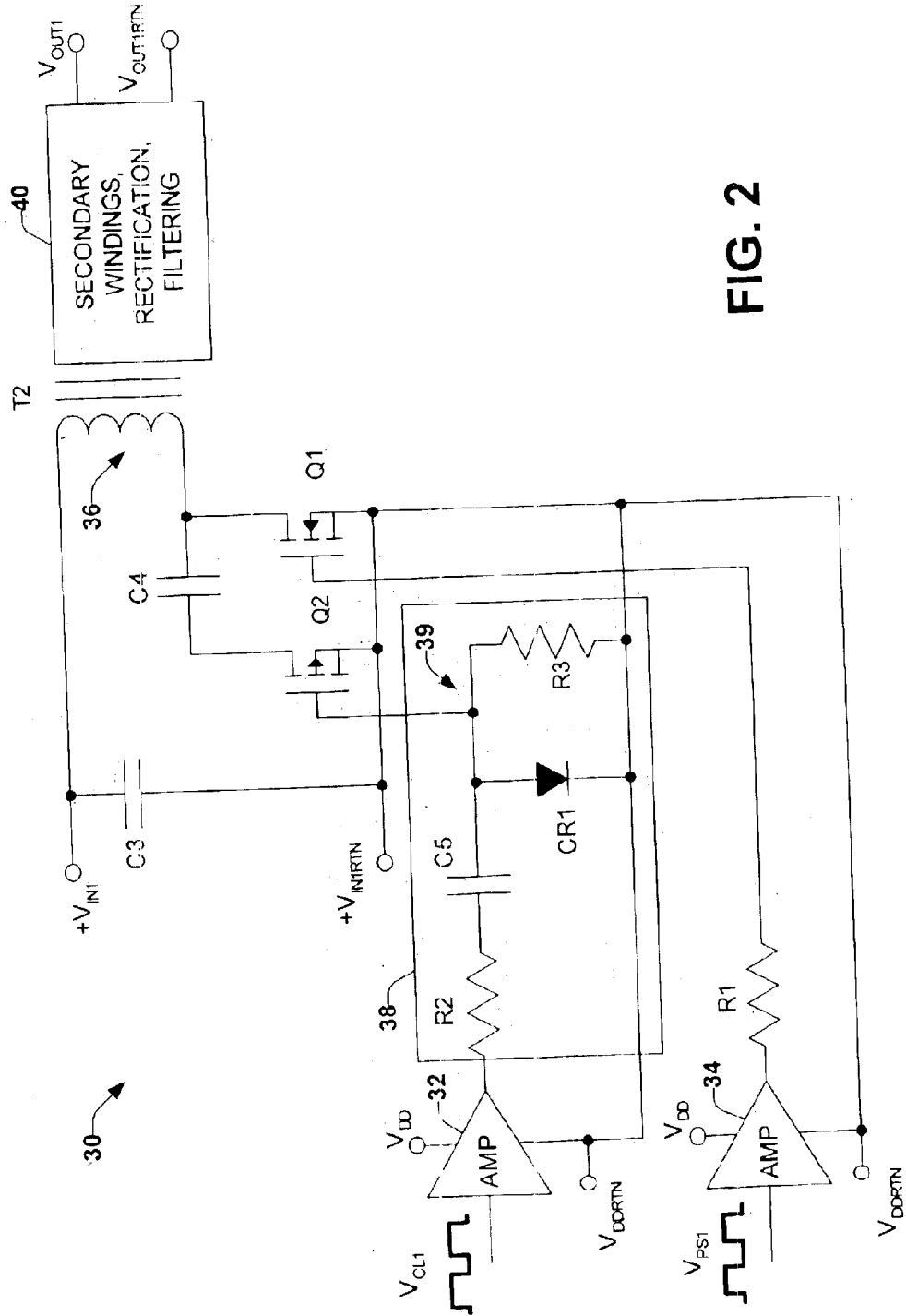
FIG. 2 illustrates a schematic block diagram of a DC/DC converter employing a p-type MOSFET device as a clamping device and an n-type MOSFET device as a power switch in accordance with an aspect of the present invention.

FIG. 2 illustrates a DC/DC converter 30 employing an enhancement mode p-type MOSFET device as a clamping device and an enhancement mode n-type MOSFET device as a power switch in accordance with an aspect of the present invention. The DC/DC converter 30 includes a transformer T2 having a primary winding 36 with a first terminal coupled to an input supply voltage terminal $+V_{IN1}$ and a second terminal connected in series with a n-type MOSFET power switch Q1 to the input return terminal $+V_{INT1RTN}$. An input filter capacitor C3 is connected to an input supply terminal $+V_{IN1}$ and the input supply return terminal $+V_{IN1RTN}$. The primary winding 36 is coupled to a secondary windings, rectification and filtering circuit 40 to provide a regulated output voltage at the output terminals $V_{OUT1}$ and $V_{OUT1RTN}$.

The n-type MOSFET power switch Q1 is controlled by a power switch drive signal $V_{PS1}$ derived from a duty cycle modulator device (not shown) or the like. The power switch drive signal $V_{PS1}$ is provided to an amplifier driver device 34 that buffers and/or amplifies the power switch driver signal $V_{PS1}$. The output of the amplifier driver 34 is coupled to the gate of the n-type MOSFET power switch Q1 through a resistor R1. The power switch drive signal $V_{PS1}$ includes voltage level transitions that toggle between a positive bias voltage and ground to turn the n-type MOSFET power switch Q1 between an "ON" state and an "OFF" state. The power switch drive signal $V_{PS1}$ is driven through the amplifier driver device 34. The n-type MOSFET power switch Q1 is switched between an "ON" and an "OFF" state. While the n-type MOSFET power switch Q1 is "ON", it connects the primary winding 36 across the input voltage supply from $+V_{IN1}$ to $+V_{IN1RTN}$. While the n-type MOSFET power switch Q1 is "OFF", the electromagnetic properties of the transformer T2 cause the voltage across the primary winding 36 to change polarity. The alternating voltage on the primary winding 38 is electromagnetically coupled by the transformer T2 to a secondary windings, rectification and filtering circuitry 40, which then produces a regulated DC output voltage between terminals $V_{OUT1}$ and $V_{OUT1RTN}$.

The drain of a p-type MOSFET clamp device Q2 is coupled to a first end of a capacitor C4, and the drain of the n-type MOSFET power switch Q1 is coupled to the second end of the capacitor C4. The second terminal of the primary winding 36 or common node is also coupled to the second end of the capacitor C4. The source of the p-type MOSFET clamp device Q2 and source of the n-type MOSFET power switch Q1 are coupled to the input return terminal $+V_{IN1RTN}$. The p-type MOSFET clamp device Q2 is controlled by a clamp drive signal $V_{CL1}$ derived from a duty cycle modulator device (not shown) or the like. The clamp drive signal $V_{CL1}$ is provided to an amplifier driver device 32 that buffers and/or amplifies the clamp drive signal $V_{CL1}$. The clamp drive signal $V_{CL1}$ is then provided to a level shifter device 38. The level shifter device 38 shifts the voltage level range of the clamp drive signal $V_{CL1}$ from a first voltage level range that toggles between a positive voltage and near or about zero voltage to a second voltage level range that toggles between near or about zero voltage and a negative voltage to drive the p-type MOSFET clamp device Q2 with a voltage outside a voltage range of the input supply voltage without employing a negative voltage power supply. The amplifier devices 32 and 34 both toggle between a device supply voltage $V_{DD}$ and $V_{DDRTN}$. The return of the device supply voltage $V_{DDRTN}$ and the input voltage return $+V_{IN1RTN}$ are coupled together. Although the clamping device of FIG. 2 is illustrated as a p-type enhancement mode MOSFET, any clamping device exhibiting similar characteristics can be employed.

Figure 4:
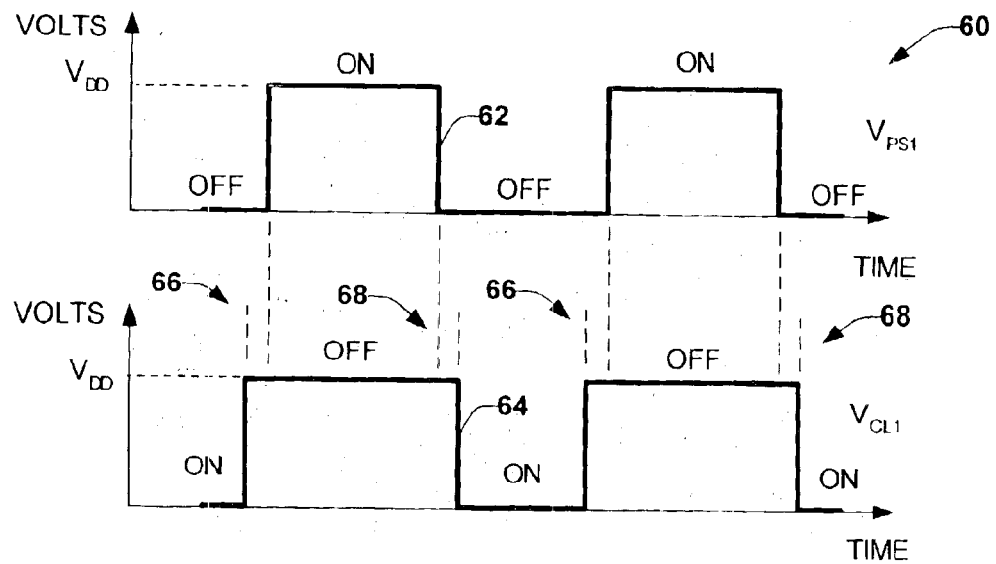
FIG. 4 illustrates a graph of voltage versus time for exemplary gate command drive signals for the DC/DC converter of FIG. 2.

FIG. 4 illustrates a graph 60 of voltage versus time for exemplary gate command drive signals for the DC/DC converter 30 of FIG. 2. A power switch drive signal $V_{PS1}$ waveform 62 toggles between $V_{DD}$ and $V_{DDRTN}$, while a clamp drive signal $V_{CL1}$ waveform 64 also toggles between $V_{DD}$ and $V_{DDRTN}$. The n-type MOSFET power switch Q1 is in an "OFF" state when the power switch drive signal $V_{PS1}$ waveform 62 is at $V_{DDRTN}$. The n-type MOSFET power switch Q1 is in an "ON" state when power switch drive signal $V_{PS1}$ waveform 62 is at $V_{DD}$. The p-type MOSFET clamp device Q2 is in an "ON" state when the clamp drive signal $V_{CL1}$ waveform 64 is at $V_{DDRTN}$. The p-type MOSFET clamp device Q2 is in an "OFF" state when the clamp drive signal $V_{CL1}$ waveform 64 is at $V_{DD}$.

As illustrated in the graph 60, the clamp drive signal $V_{CL1}$ waveform 64 toggles from an "ON" state to an "OFF" state, while the power switch drive signal $V_{PS1}$ waveform 62 remains in an "OFF state for a first delay time period 66. The first delay time period 66 mitigates or avoids current conduction of the clamp device and the power switch at the same time. The power switch drive signal $V_{PS1}$ waveform 62 then transitions to an "ON" state, shorting the second terminal of the primary windings 36 of the transformer T2 to $+V_{IN1RTN}$. The power switch drive signal $V_{PS1}$ waveform 62 then transitions to an "OFF" state, while the clamp drive signal $V_{CL1}$ wave form 64 remains in the "OFF" state for a second delay time period 68. The second delay time period 68 mitigates or avoids current conduction of the clamp device and the power switch at the same time. After the second delay time period 68, the clamp drive signal $V_{CL1}$ waveform 64 transitions to the "ON" state.

The operation of the DC/DC converter of FIG. 2 with respect to the waveforms 62 and 64 illustrated in FIG. 4 will now be described. During the second delay time period 68, the n-type MOSFET power switch Q1 is turned "OFF", while the p-type MOSFET clamp device Q2 remains "OFF". The voltage across the n-type MOSFET power switch Q1 increases until it is held by the drain-source diode of the p-type MOSFET clamp device Q2 in series with the capacitor C4. After the second time delay period 68, the p-type MOSFET clamp device Q2 is turned "ON". At some time after the n-type MOSFET power switch Q1 is turned "OFF" and before the p-type MOSFET clamp device Q2 is turned "OFF", current flowing through the p-type MOSFET clamp device Q2 changes polarity. To minimize the voltage stress on the n-type MOSFET power switch Q1, it is necessary to turn "ON" the p-type MOSFET clamp device Q2 before the current flowing through it reaches zero. After the current changes polarity, it actively resets the magnetic field of the transformer T2.

The p-type MOSFET clamp device Q2 then turns "OFF" followed by the first delay time period 66 after which the n-type MOSFET power switch Q1 turns "ON". Current then flows through the primary winding 36 of the transformer T2 from the supply $+V_{IN1}$ and through the n-type MOSFET power switch Q1 to $+V_{IN1RTN}$. The process continuously repeats as the input signals to the p-type MOSFET clamp device Q2 and the n-type MOSFET power switch Q1 cause the p-type MOSFET clamp device Q2 and n-type MOSFET power switch Q1 to turn "ON" and "OFF" in generally opposing states, while the p-type MOSFET clamp device Q2 assures that the voltage on the second terminal of the transformer T2 is limited.

The gate drive command signals illustrated in FIG. 4 show the sequence of transitions in the command signals necessary to assure that Q1 and Q2 of FIG. 2 do not conduct current at the same time. The gate drive command signals shown in FIG. 4 do not constitute a requirement that the DC/DC converter 30 shall operate with the command signal operating at any particular duty cycle or any particular amount of delay between one transition and the next.

Referring again to FIG. 2, the level shifter circuit 38 shifts the voltage level transitions of the clamp drive signal $V_{CL1}$ at the output of the amplifier driver 32 from a first voltage level range that toggles between $V_{DD}$ and $V_{DDRTN}$ to a second voltage level range that toggles between a near or about zero voltage and a negative voltage. The level shifter circuit 38 includes a resistor R2 coupled to the output of the amplifier driver 32 and connected in series with a first end of a capacitor C5. The capacitor C5 is coupled to an output terminal 39 at its second end. The resistor R3 is coupled between the output terminal 39 and ground and a diode CR1 is coupled between the output terminal and ground. The output terminal 39 is coupled to the gate of the p-type MOSFET clamp device Q2. The level shifter 38 enables the driver to produce a final output at the gate of the p-type MOSFET clamp device Q2 that alternates between negative and near or about zero, while the amplifier driver 32 is powered only by a positive gate drive supply ($V_{DD}$).

When the output of the amplifier driver 32 goes high, C5 charges up quickly and CR1 is forward biased. The first end of C5 is charged up to the upper limit of the output of the amplifier driver 32 minus any remaining voltage drop on R2, while the second end of capacitor C5 is held down to no more than one diode drop above $+V_{IN1RTN}$. When the output of the amplifier driver 32 goes low, C5 discharges slowly and CR1 is reverse biased. The first end of capacitor C5 is pulled down to the lower limit of the output of the amplifier driver 32 plus any remaining voltage drop on R2, while capacitor C5 retains its charge from the previous half cycle, thus presenting a negative voltage to the gate of the p-type MOSFET clamp device Q2.

The value of C5 should be set large enough to retain enough voltage to drive Q2 "ON" after being partially discharged by the loads at the output terminal 39 of the level shifter. The loads at the output terminal 39 of the level shifter can include: the gate charge on Q2 for a turn-on transition; the reverse recovery charge of CR1; the current drawn by R3 for the full duration of one switching period; the gate source leakage current of Q2 for the full duration of one switching period; and the reverse bias leakage current of CR1 for the full duration of one switching period.

The following guidelines can be employed to select the value of R2 and gate drive amplifier 32 capacity to assure proper operation of the clamp driver circuitry. For example, the minimum duty cycle can be defined for continuous operation at normal power levels. The value of R2 can be set small enough and select a gate drive amplifier with enough drive capacity to charge up C5 enough to drive Q2, while operating at the minimum duty cycle. The value of R2 can be adjusted downward if it mitigates power loss in Q2. When the DC/DC converter 30 first begins to apply a duty cycle of greater than zero, on the first upward transition of the output of the amplifier driver 32, the amplifier driver 32 is presented with a load consisting of a series connection of R2, a fully discharged C3, and a forward biased CR1. The fact that C5 is fully discharged makes this start-up load much heavier than the normal load. To limit the peak current that flows during this startup condition, the value of the resistor R2 may be increased and/or the value of the capacitor C5 may be reduced. Also or alternatively, allowance for this startup condition can be employed in the selection of the gate drive amplifier 32 and/or the power supply capacitance for that amplifier. However, it is not essential to completely charge C5 in the first cycle.

For example, the recommended value of R3 can be set to no more than the maximum recommended value $R3_{MAX}$ such that:

$$R3_{MAX}=0.5*ABS(V_{GSTH})_{MIN}/(I_{DGMAX}-I_{GSMIN}-I_{RMIN}) \qquad \text{EQ. 1}$$

where $ABS(V_{GSTH})_{MIN}$ is the Minimum Absolute value of Gate-Source Threshold Voltage of Q2, $I_{DGMAX}$ is the Maximum Drain-Gate Leakage of Q2, $I_{GSMIN}$ is the Minimum Gate-Source Leakage of Q2, and $I_{RMIN}$ is the Minimum Reverse Current of CR1. If $I_{DGMAX}$ is less than $I_{GSMIN}+I_{RMIN}$, then R3 is not required. If no specification of $I_{GSMIN}$ is available, it should be assumed to be zero. If no specification of $I_{RMIN}$ is available, it should be assumed to be zero. The purpose of R3 is to assure that the gate-source voltage of Q2 does not drift in the negative direction. If the gate-source voltage of Q2 starts to drift in the negative direction, then gate-source voltage of Q2 in the "OFF" state starts to drift towards the gate-source threshold voltage, which is undesirable. However, an excessively low value of R3 aggravates the size requirement for C5.

It is to be appreciated that the resistors R1 and R2 are optional and can be omitted with the output of the amplifier 34 connected directly to the gate of Q1 and the output of the amplifier 32 connected directly to the first end of C5. The inclusion of R1 and R2 is recommended for use with present day devices to control ringing on the gate voltage during switching transitions and to control the current that initially flows when C5 is charged up for the first time. Additionally, R3 may be omitted from the circuit 30. The inclusion of R3 is recommended for use with present day devices to assure that the gate-source voltage of Q2 stays within predictable limits. Also, R3 and C5 can be transposed without effecting the operation of the DC/DC converter 30. Inverting amplifiers can be employed to drive the gates of Q1 and Q2 as long as Q1 and Q2 do not conduct current at the same time. The sequence of direction of gate drive command signals transitions would be reversed.

Figure 3:
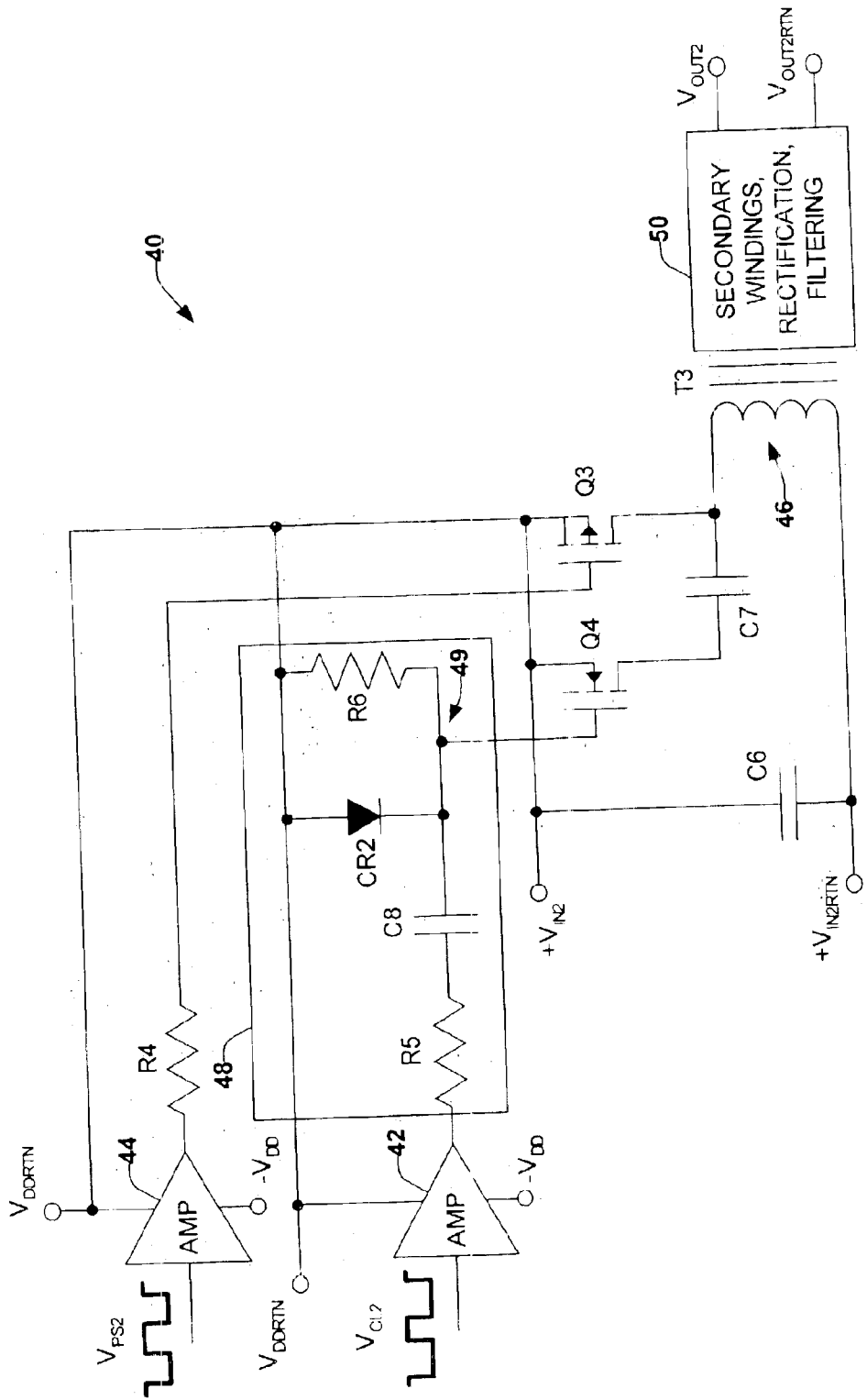
FIG. 3 illustrates a schematic block diagram of a DC/DC converter employing an n-type MOSFET device as a clamping device and a p-type MOSFET device as a power switch in accordance with an aspect of the present invention.

FIG. 3 illustrates a DC/DC converter 40 employing an enhancement mode n-type MOSFET device as a clamping device and an enhancement mode p-type MOSFET device as a power switch in accordance with an aspect of the present invention. The DC/DC converter 40 includes a transformer T3 having a primary winding 46 with a first terminal coupled to an input supply voltage return terminal $+V_{IN2RTN}$ and a second terminal connected in series with a P-type MOSFET power switch Q3 to the input supply voltage terminal $+V_{IN2}$. An input filter capacitor C6 is connected to the input supply terminal $+V_{IN2}$ and the input supply return terminal $+V_{IN2RTN}$. The primary winding 46 is coupled to a secondary windings, rectification and filtering circuit 50 to provide a regulated output voltage at the output terminals $V_{OUT2}$ and $V_{OUT2RTN}$.

The p-type MOSFET power switch Q3 is controlled by a power switch drive signal $V_{PS2}$ derived from a duty cycle modulator device (not shown) or the like. The power switch drive signal $V_{PS2}$ is provided to an amplifier driver device 44 that buffers and/or amplifies the power switch driver signal $V_{PS2}$. The output of the amplifier driver device 44 is coupled to the gate of the p-type MOSFET power switch Q3 through a resistor R4. The power switch drive signal $V_{PS2}$ includes voltage level transitions that toggle between $(+V_{IN2}-V_{DD})$ and $+V_{IN2}$ to turn the p-type MOSFET power switch Q3 between an "ON" state and an "OFF" state. The power switch drive signal $V_{PS2}$ is driven through the amplifier driver device 44. The p-type MOSFET power switch Q3 is switched between an "ON" and an "OFF" state. While the p-type MOSFET power switch Q3 is "ON", it connects the primary winding 46 across the input voltage supply from $+V_{IN2}$ to $+V_{IN2RTN}$. While the p-type MOSFET power switch Q3 is "OFF", the electromagnetic properties of the transformer T3 cause the voltage across the primary winding 46 to change polarity. The alternating voltage on the primary winding 46 is electromagnetically coupled by the transformer T3 to the secondary windings, rectification and filtering circuitry 50, which then produced a regulated DC output voltage between terminals $V_{OUT2}$ and $V_{OUT2RTN}$.

The drain of a n-type MOSFET clamp device Q4 is coupled to a first end of a capacitor C7 and the drain of the p-type MOSFET power switch Q3 is coupled to the second end of the capacitor C7. The second terminal of the primary winding 46 or common node is also coupled to the second end of the capacitor C7. The source of the n-type MOSFET clamp device Q4 and the source of the p-type MOSFET power switch Q3 are coupled to the input terminal $+V_{IN2}$. The n-type MOSFET clamp device Q3 is controlled by a clamp drive signal $V_{CL2}$ derived from a duty cycle modulator device (not shown) or the like. The clamp drive signal $V_{CL2}$ is provided to an amplifier driver device 42 that buffers and/or amplifies the clamp drive signal $V_{CL2}$. The amplifier driver device 42 and the amplifier driver device 44 are coupled to a device supply voltage $-V_{DD}$. The device supply voltage $-V_{DD}$ is negative with respect to the input voltage $+V_{IN2}$ (below the input voltage $+V_{IN2}$). Therefore, the device input voltage $+V_{IN2}$ plus the device supply voltage $-V_{DD}$ is less than (below) the input voltage $+V_{IN2}$, and it is expressed as $+V_{IN2}-V_{DD}$.

The clamp drive signal $V_{CL2}$ is then provided to a level shifter device 48. The level shifter device 48 shifts the voltage level range of the clamp drive signal $V_{CL2}$ from a first voltage level range that toggles between near or about the input voltage $+V_{IN2}$ and the input voltage $+V_{IN2}$ plus a device supply voltage $-V_{DD}$ $(+V_{IN2}-V_{DD})$ to a second voltage level range that toggles between a positive voltage level above the input voltage $+V_{IN2}$ and near or about the input voltage $+V_{IN2}$ to drive the n-type MOSFET clamp device Q4 with a voltage that is outside a voltage range of the input supply voltage without employing an additional power supply. The amplifier devices 42 and 44 both toggle between the maximum input voltage $+V_{IN2}$ and the maximum input voltage $+V_{IN2}$ plus a device supply voltage $-V_{DD}$ $(+V_{IN2}-V_{DD})$. The return of the device supply voltage $V_{DDRTN}$ and the input voltage $V_{IN2}$ are coupled together. Although the clamping device of FIG. 3 is illustrated as an n-type enhancement mode MOSFET, any clamping device exhibiting similar characteristics can be employed.

Figure 5:
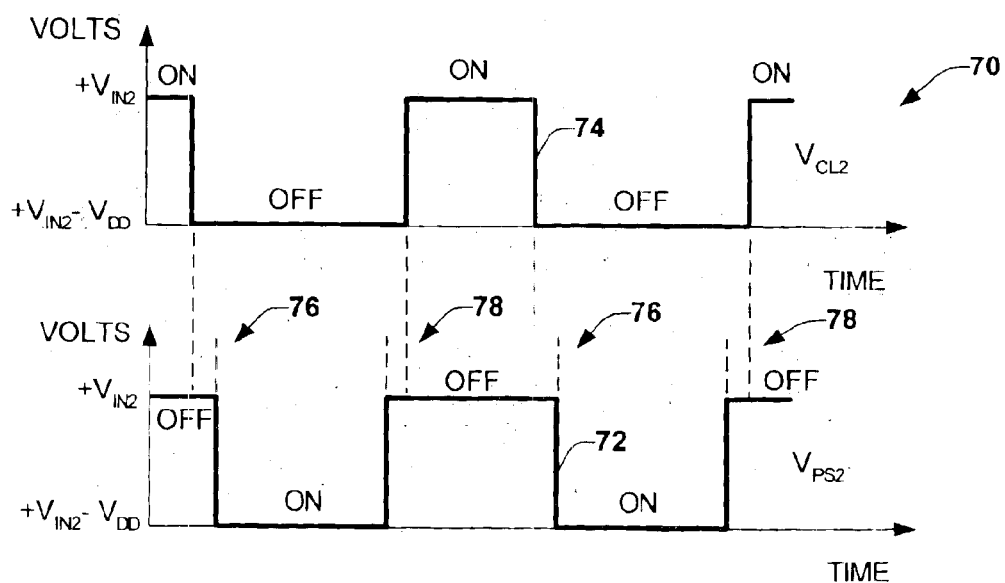
FIG. 5 illustrates a graph of voltage versus time for exemplary gate command drive signals for the DC/DC converter of FIG. 3.

FIG. 5 illustrates a graph 70 of voltage versus time for exemplary gate command drive signals for the DC/DC converter 40 of FIG. 3. A power switch drive signal $V_{PS2}$ waveform 72 toggles between $+V_{IN2}$ and $+V_{IN2}-V_{DD}$, while a clamp drive signal $V_{CL2}$ waveform 74 also toggles between $+V_{IN2}$ and $+V_{IN2}-V_{DD}$. The p-type MOSFET power switch Q3 is in an "OFF" state when the power switch drive signal $V_{PS2}$ waveform 72 is at $+V_{IN2}$. The p-type MOSFET power switch Q3 is in an "ON" state when power switch drive signal $V_{PS2}$ waveform 72 is at $+V_{IN2}-V_{DD}$. The n-type MOSFET clamp device Q4 is in an "ON" state when the clamp drive signal $V_{CL2}$ waveform 74 is at $+V_{IN2}$. The n-type MOSFET clamp device Q4 is in an "OFF" state when the clamp drive signal $V_{CL2}$ waveform 74 is at $+V_{IN2}-V_{DD}$.

As illustrated in the graph 70, the clamp drive signal $V_{CL2}$ waveform 74 toggles from an "ON" state to an "OFF" state, while the power switch drive signal $V_{PS2}$ waveform 72 remains in an "OFF" state for a first delay time period 76. The first delay time period 76 mitigates or avoids current conduction of the clamp device and the power switch at the same time. The power switch drive signal $V_{PS2}$ waveform 72 then transitions to an "ON" state, shorting the second terminal of the primary windings 46 of the transformer T3 to $+V_{IN2}$. The power switch drive signal $V_{PS2}$ waveform 72 then transitions to an "OFF" state, while the clamp drive signal $V_{CL2}$ waveform 74 remains in the "OFF" state for a second delay time period 78. The second delay time period 78 mitigates or avoids current conduction of the clamp device and the power switch at the same time. After the second delay time period 78, the clamp drive signal $V_{CL2}$ waveform 74 transitions to the "ON" state.

Referring again to FIG. 3, the level shifter circuit 48 shifts the voltage level range of the clamp drive signal $V_{CL2}$ at the output of the amplifier driver 42 from a first voltage level range that toggles between $+V_{IN2}$ and $+V_{IN2}-V_{DD}$ to a second voltage level range that toggles between a voltage above $+V_{IN2}$ and a voltage near or about $+V_{IN2}$ to turn the n-type MOSFET clamp device Q4 "ON" and "OFF", respectively. The level shifter circuit 48 includes a resistor R5 coupled to the output of the amplifier driver 42 and connected in series with a first end of a capacitor C8. The capacitor C8 is coupled to an output terminal 49 at its second end. A resistor R6 is coupled between the output terminal 49 and $+V_{IN2}$ and a diode CR2 is coupled between the output terminal 49 and $+V_{IN2}$. The output terminal 49 is coupled to the gate of the n-type MOSFET clamp device Q4. The level shifter 48 enables the driver to produce a final output at the gate of the n-type MOSFET clamp device Q4 that alternates between a voltage above $+V_{IN2}$ and a voltage near or about $+V_{IN2}$, while the amplifier driver 42 is powered only by a negative gate drive supply $(-V_{DD})$.

When the output of the amplifier driver 42 goes low, C8 charges down quickly and CR2 is forward biased. The first end of C8 is charged down to the lower limit of the output of the amplifier driver 42 plus any remaining voltage drop on R5, while the second end of capacitor C8 is held up to no less than one diode drop below $+V_{IN2}$. When the output of the amplifier driver 42 goes high, C8 discharges slowly and CR2 is reverse biased. The first end of capacitor C8 is pulled up to the upper limit of the output of the amplifier driver 42 minus any remaining voltage drop on R5, while capacitor C8 retains its charge from the previous half cycle, thus presenting a positive voltage above $+V_{IN2}$ to the gate of the n-type MOSFET clamp device Q4.

It is to be appreciated that the resistors R4 and R5 are optional and can be omitted with the output of the amplifier 44 connected directly to the gate of Q3 and the output of the amplifier 42 connected directly to the first end of C8. The inclusion of R4 and R5 is recommended to control ringing on the gate voltage during switching transitions and to control the current that initially flows when C8 is charged down for the first time. Additionally, R6 may be omitted from the circuit 40. The inclusion of R6 is recommended to assure that the gate-source voltage of Q4 stays within predictable limits. Also, R5 and C8 can be transposed without effecting the operation of the DC/DC converter 40. Inverting amplifiers can be employed to drive the gates of Q3 and Q4 as long as Q3 and Q4 do not conduct current at the same time. The sequence of direction of gate drive command signals transitions would be reversed.

Figure 6:
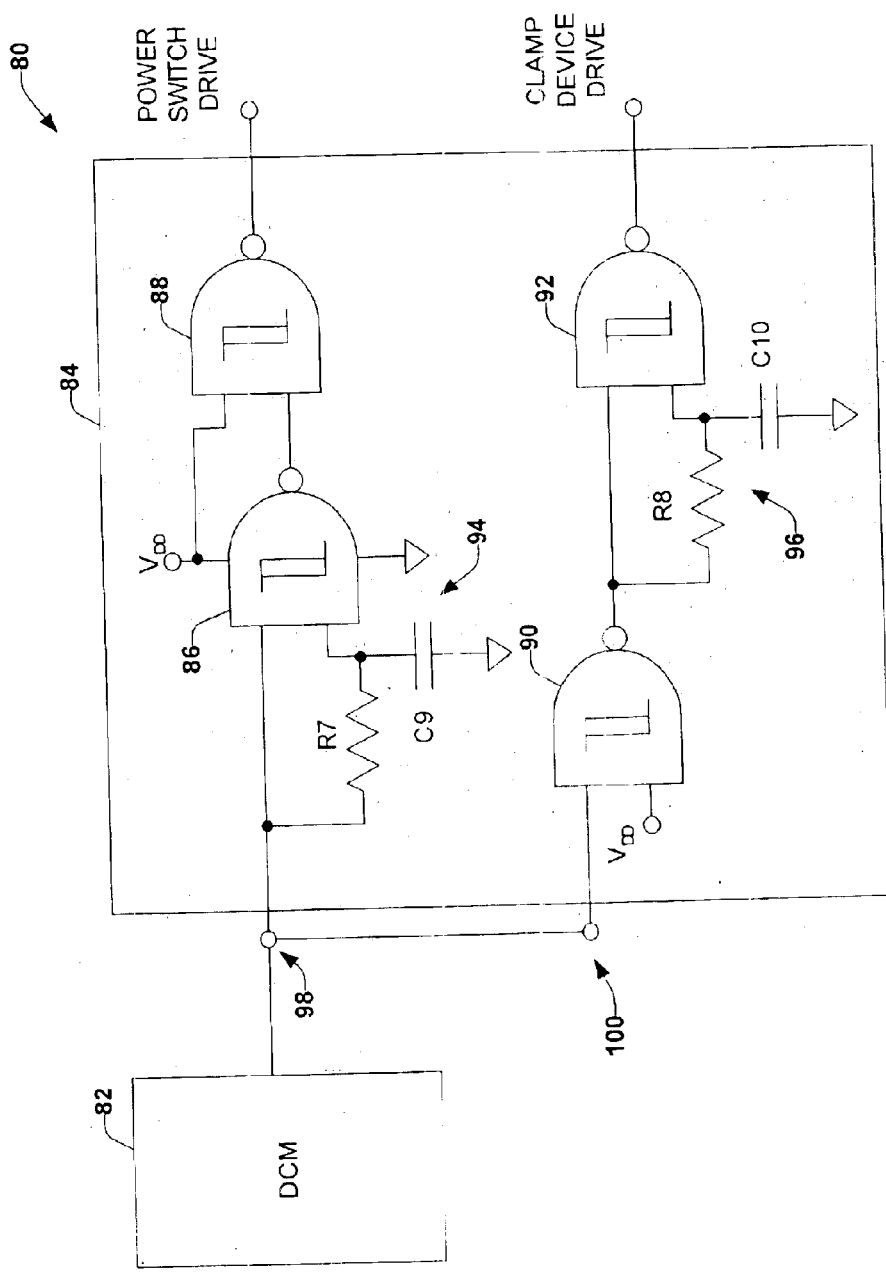
FIG. 6 illustrates a schematic block diagram of a system for generating gate drive command signals in accordance with an aspect of the present invention.

FIG. 6 illustrates a system 80 for generating gate drive command signals in accordance with an aspect of the present invention. The system 80 includes a duty cycle modulator device(DCM) 82 coupled to a gate drive logic component 84. The gate drive logic component 84 receives the pulse waveform from the DCM device 82 and generates a power switch drive signal and a clamp drive signal. The power switch drive signal can then be provided to an amplifier driver device prior to driving a power switch, and the clamp drive signal can be provided to an amplifier device prior to level shifting and driving of a clamp device. The gate drive logic component 84 includes a quad 2-input schmitt trigger NAND device. The gate drive logic component 84 includes a first input terminal 98 directly coupled to a first input of a first NAND device 86 and a second input of the first NAND device 86 through a delay circuit 94. The delay circuit 94 is comprises of a resistor R7 and capacitor C9 that causes the first delay time period (see FIG. 4) between the power switch drive signal and the clamp drive signal. The gate drive logic component 84 includes a second input terminal 100 coupled directly to a first input of a second NAND device 90. A second input of the second NAND device 90 is coupled directly to supply power $V_{DD}$. The first input terminal 98 and the second input terminal 100 are coupled to the DCM output, such that the pulse waveform of the DCM output is received by both the first and second input terminals 98 and 100.

The output of the first NAND device 86 is coupled to a first input of a third NAND device 88 with a second input of the third NAND device 88 coupled directly to supply power $V_{DD}$. The output of the third NAND device 88 provides the power switch drive signal. The output of the second NAND device 90 is coupled to a first input of a fourth NAND device 92 and a second input of the fourth NAND device 92 through a second delay circuit 96. The second delay circuit 96 is comprised of a resistor R8 and capacitor C10 that causes the second delay time period (see FIG. 4) between the power switch drive signal and the clamp device drive signal. The output of the fourth NAND device 92 provides the clamp device drive signal. It is to be appreciated that the system 80 is only one exemplary implementation for generating the gate drive command signals and a variety of other implementation can be employed to generate the gate drive command signals.

Figure 7:
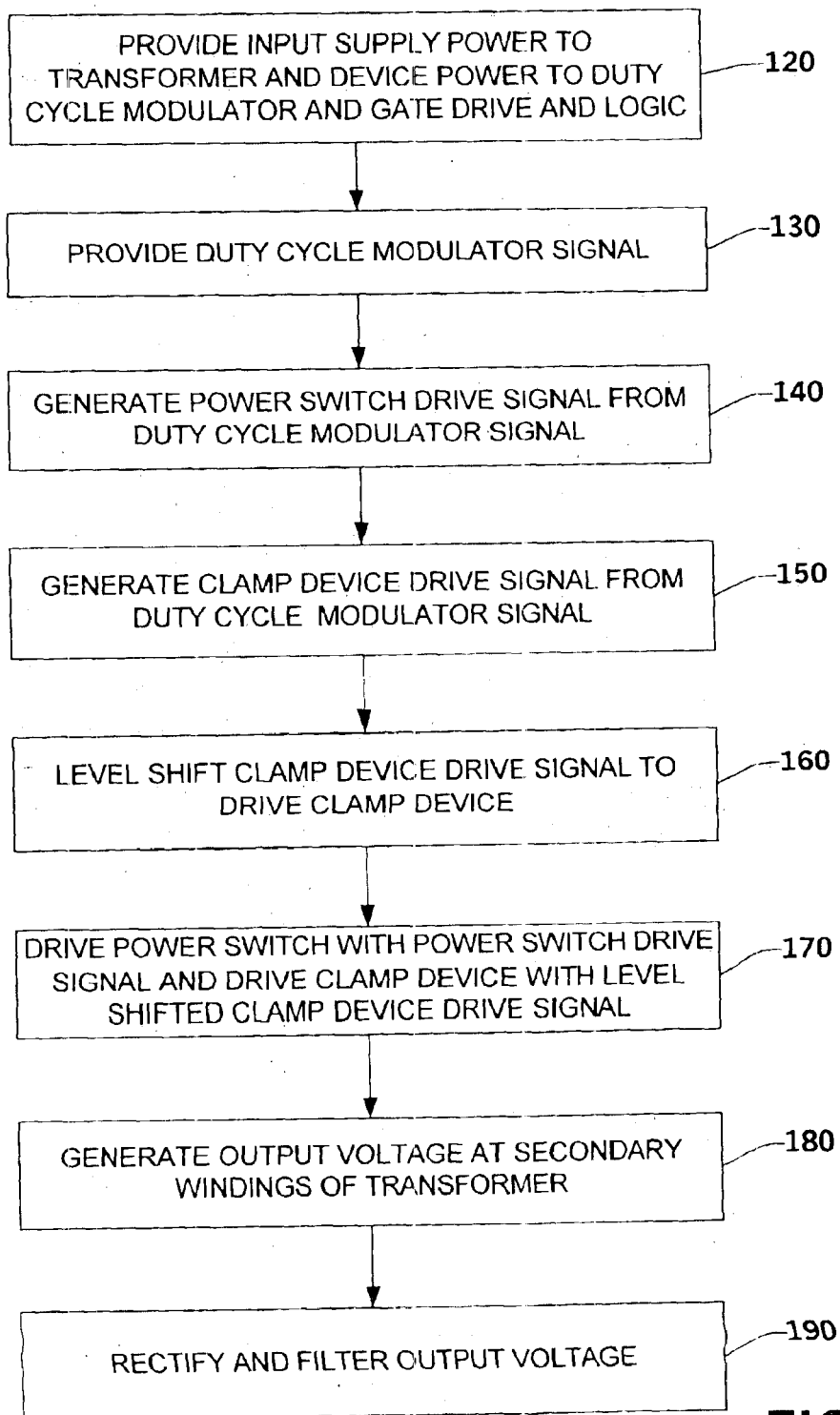
FIG. 7 illustrates a methodology for operating a DC/DC converter with a clamp device that limits the peak voltage of a main power switch during switching in accordance with an aspect of the present invention.

In view of the foregoing structural and functional features described above, a methodology in accordance with various aspects of the present invention will be better appreciated with reference to FIG. 7. While, for purposes of simplicity of explanation, the methodology of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 7 illustrates a methodology for operating a DC/DC converter (e.g., forward converter) with a clamp device that limits the peak voltage of a main power switch during switching in accordance with an aspect of the present invention. The methodology begins at 120 where input supply power is provided to the primary windings of a transformer of the DC/DC converter and device power is provided to a duty cycle modulator and gate drive logic. At 130, a duty cycle modulator generates a duty cycle modulator signal. The methodology then proceeds to 140. At 140, a power switch drive signal is generated from the duty cycle modulator signal. The power switch drive signal includes voltage level transitions that cause the power switch to switch between an "ON" state and an "OFF" state. At 150, a clamp device drive signal is generated from the duty cycle modulator signal. The clamp device drive signal includes voltage level transitions that cause the clamp device to switch between an "ON" state and an "OFF" state. The power switch drive signal and the clamp device drive signal can be generated concurrently, for example, employing a gate drive logic device, such as that illustrated in FIG. 6. The clamp device drive signal can have a first delay time period and a second delay time period with respect to the power switch drive signal to avoid current conduction of the clamp device and the power switch at the same time. The methodology then proceeds to 160.

At 160, the voltage level transitions of the clamp device drive signal are level shifted from a first voltage level range to a second voltage level range to drive the clamp device with a voltage that is outside the voltage range of the input supply voltage. For example, if the clamping device is an enhancement mode p-type MOSFET device and the power switch is an enhancement mode n-type MOSFET device, the level shifter can shift the clamping device drive signal from a first voltage level range that toggles between a positive voltage and near or about zero voltage to a second voltage level range that toggles between a near or about zero voltage and a negative voltage. If the clamping device is an n-type MOSFET device and the power switch is a p-type MOSFET device, the level shifter can shift the clamping device drive signal from a first voltage level range that toggles between a supply voltage and a supply voltage minus a device voltage to a second voltage level range that toggles between a positive voltage level above the supply voltage and the supply voltage. The methodology then proceeds to 170.

At 170, the power switch is driven with the power switch drive signal and the clamp device is driven with the level shifted clamp device drive signal. The clamp device limits the peak voltage at the primary winding of the transformer when the main power switch is turned "OFF" and activity resets the magnetic field of the transformer. At 180, the output voltage is generated at the secondary windings of the transformer. The output voltage is then rectified and filtered at 190 to provide a regulated output voltage.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A Direct Current-to-Direct Current (DC/DC) voltage converter comprising:
   a transformer being operative to receive an input supply voltage at a primary winding and generate an output voltage at a secondary winding;
   a power switch in series with the primary winding, the power switch receives a power switch drive signal with voltage level transitions that switch the power switch between an "ON" state that applies the input supply voltage across the primary winding and an "OFF" state that removes the input supply voltage from across the primary winding;
   a clamp device that limits a peak voltage at a common node of the primary winding and the power switch, the clamp device receives a clamp device drive signal with voltage level transitions that switch the clamp device between "ON" and "OFF" states that are generally opposed to the "ON" and "OFF" states of the power switch; and
   a level shifter that shifts the voltage level transitions of the clamp device drive signal from a first voltage level range to a second voltage level range to drive the clamp device with a voltage that is outside a voltage range of the input supply voltage.

2. The converter of claim 1, the power switch being an enhancement mode n-type MOSFET device and the clamp device being an enhancement mode p-type MOSFET device.

3. The converter of claim 2, the n-type MOSFET device and the p-type MOSFET device having sources coupled to an input supply voltage return, the p-type MOSFET device having a drain coupled to the common node through a capacitor, and the n-type device having a drain coupled to the common node, the gate of the n-type MOSFET device being driven by the power switch drive signal and the gate of the p-type MOSFET device being driven by the level shifted clamp device drive signal.

4. The converter of claim 2, the first voltage level range having voltage level transitions between a positive voltage and about zero voltage and the second voltage level range having voltage level transitions between about zero voltage and a negative voltage.

5. The converter of claim 1, the power switch being an enhancement mode p-type MOSFET device and the clamp device being an enhancement mode n-type MOSFET device.

6. The converter of claim 5, the p-type MOSFET device and the n-type MOSFET device having sources coupled to the input supply voltage, the n-type MOSFET device having a drain coupled to the common node through a capacitor, and the p-type device having a drain coupled to the common node, the gate of the p-type MOSFET device being driven by the power switch drive signal and the gate of the n-type MOSFET device being driven by the level shifted clamp device drive signal.

7. The converter of claim 5, the first voltage level range having voltage level transitions between an input supply voltage and the input supply voltage minus a device voltage and the second voltage level range having voltage level transitions between a positive voltage above the input supply voltage and about the input supply voltage.

8. The converter of claim 1, the clamp device drive signal and the power switch drive signal have a sequence of transitions that mitigate current conduction of the clamp device and the power switch at the same time.

9. The converter of claim 8, the sequence of transitions cause the clamp device to remain in an "OFF" state for a first delay time period after the power switch transitions from an "ON" state to an "OFF" state to mitigate current conduction of the clamp device and the power switch at the same time.

10. The converter of claim 9, the sequence of transitions cause the power switch to remain in an "OFF" state for a second delay time period after the clamp device transitions from an "ON" state to an "OFF" state to mitigate current conduction of the clamp device and the power switch at the same time.

11. The converter of claim 1, further comprising a gate command logic device, the gate command logic device generates the clamp device drive signal and the power switch drive signal from a signal provided by a duty cycle modulator.

12. The converter of claim 11, the gate command logic device being a quad 2-input schmitt trigger NAND device.

13. The converter of claim 11, further comprising a first amplifier that drives the clamp device drive signal to the clamp device through the level shifter and a second amplifier that drives the power switch drive signal to the power switch.

14. The converter of claim 1 being a forward converter or double forward converter.

15. A forward converter or double forward converter that converts an input supply voltage to an output voltage the forward converter or double forward converter having a power switch in series with a primary winding of a transformer and a clamping device that limits a peak voltage at a common node of the primary winding and power switch that actively resets the magnetic field of the transformer, the converter comprising:
   means for generating a power switch drive signal and a clamp device drive signal from a duty cycle modulated waveform, the power switch drive signal having voltage level transitions that switch the power switch between "ON" and "OFF" states and the clamp device drive signal having voltage level transitions to switch the clamp device between "OFF" and "ON" states, the clamp device drive signal and the power switch drive signal have a sequence of transitions that mitigates current conduction of the clamp device and the power switch at the same time; and
   means for shifting the voltage level transitions of the clamping device drive signal from a first voltage level range to a second voltage level range to drive the clamp device with a voltage that is outside a voltage range of the input supply voltage.

16. The converter of claim 15, the power switch being one of an enhancement mode n-type MOSFET device and an enhancement mode p-type MOSFET device and the clamp device being the other of an enhancement mode n-type MOSFET device and an enhancement mode p-type MOSFET device.

17. The converter of claim 15, the first voltage level range having voltage level transitions between a positive device voltage and about zero voltage and the second voltage range having voltage level transitions between about zero voltage and a negative voltage.

18. The converter of claim 15, the first voltage level range having voltage level transitions between about the input supply voltage and the input supply voltage minus a device voltage and the second voltage level range having voltage level transitions between a positive voltage above the input supply voltage and about the input supply voltage.

19. The converter of claim 15, the clamp device drive signal and the power switch drive signal have a sequence of transitions that mitigate current conduction of the clamp device and the power switch at the same time, the sequence of transitions cause the clamp device to remain in an "OFF" state for a delay time period after the power switch transitions from an "ON" state to an "OFF" state.

20. The converter of claim 19, the clamp device drive signal and the power switch drive signal have a sequence of transitions that mitigate current conduction of the clamp device and the power switch at the same time, the sequence of transitions cause the power switch to remain in an "OFF" state for a delay time period after the clamp device transitions from an "ON" state to an "OFF" state.

21. A method for converting an input supply voltage to an output supply voltage employing a DC/DC voltage converter having a power switch in series with a primary winding of a transformer and a clamping device that limits a peak voltage at a common node of the primary winding and power switch to actively reset the magnetic field of the transformer, the method comprising:

generating a power switch drive signal from a duty cycle modulated waveform, the power switch drive signal having voltage level transitions that switch the power switch between "ON" and "OFF" states;

generating a clamp device drive signal from the duty cycle modulated waveform, the clamp device drive signal having voltage level transitions that switch the clamp device between "ON" and "OFF" states, the power switch drive signal and the clamp device drive signal have a sequence of transitions that mitigates current conduction of the clamp device and the power switch at the same time;

shifting the voltage level transitions of the clamping device drive signal from a first voltage level range to a second voltage level range to drive the clamp device with a voltage that is outside the voltage range of the input supply voltage;

providing the input supply voltage to the primary winding of the transformer; and driving the power switch with the power switch drive signal, while concurrently driving the clamp device with the clamp device drive signal to generate the output voltage at the secondary winding of the transformer.

22. The method of claim 21, the power switch being one of an enhancement mode n-type MOSFET device and an enhancement mode p-type MOSFET device and the clamp device being the other of an enhancement mode n-type MOSFET device and an enhancement mode p-type MOSFET device.

23. The method of claim 21, the first voltage level range having voltage level transitions between a positive device voltage and about zero voltage and the second voltage level range having voltage level transitions between about zero voltage and a negative voltage.

24. The method of claim 21, the first voltage level range having voltage level transitions between about the input supply voltage and the input supply voltage minus a device voltage and the second voltage level range having voltage level transitions between a positive voltage above the input supply voltage and about the input supply voltage.

25. The method of claim 21, the clamp device drive signal and the power switch drive have a sequence of transitions that mitigate current conduction of the clamp device and the power switch at the same time, the sequence of transitions cause the power switch and the clamp device to remain in an "OFF" state for a delay time period after the other power switch and the clamp device transitions from an "ON" state to an "OFF" state.

* * * * *